(12) United States Patent
Beringer et al.

(10) Patent No.: US 7,197,740 B2
(45) Date of Patent: Mar. 27, 2007

(54) PATTERN-BASED SOFTWARE DESIGN

(75) Inventors: Joerg Beringer, Frankfurt (DE);
Dennis B. Moore, Burlingame, CA (US)

(73) Assignee: SAP Aktiengesellschaft (DE)

( * ) Notice: Subject to any disclaimer, the term of this patent is extended or adjusted under 35 U.S.C. 154(b) by 595 days.

(21) Appl. No.: 10/655,768

(22) Filed: Sep. 5, 2003

(65) Prior Publication Data

US 2005/0055667 A1 Mar. 10, 2005

(51) Int. Cl.
*G06F 9/44* (2006.01)
(52) U.S. Cl. .................................................. 717/108
(58) Field of Classification Search ................ 717/104, 717/116, 100; 705/1
See application file for complete search history.

(56) References Cited

U.S. PATENT DOCUMENTS

| | | | | |
|---|---|---|---|---|
| 5,754,738 | A * | 5/1998 | Saucedo et al. ............. | 706/11 |
| 6,092,075 | A * | 7/2000 | Carey et al. ................ | 707/102 |
| 6,269,473 | B1 * | 7/2001 | Freed et al. ................ | 717/104 |
| 6,370,681 | B1 * | 4/2002 | Dellarocas et al. ......... | 717/110 |
| 6,601,233 | B1 * | 7/2003 | Underwood ................ | 717/102 |
| 6,877,153 | B2 * | 4/2005 | Konnersman ............... | 717/100 |
| 2002/0104068 | A1 * | 8/2002 | Barrett et al. .............. | 717/104 |
| 2002/0108099 | A1 * | 8/2002 | Paclat ........................ | 717/102 |
| 2003/0037310 | A1 * | 2/2003 | Ge ............................. | 717/113 |
| 2003/0200130 | A1 * | 10/2003 | Kall et al. .................... | 705/8 |
| 2003/0226111 | A1 * | 12/2003 | Wirts et al. ................. | 715/514 |
| 2004/0093581 | A1 * | 5/2004 | Nielsen et al. .............. | 717/101 |

FOREIGN PATENT DOCUMENTS

| JP | 11-085880 | * | 3/1999 |
|---|---|---|---|
| JP | 10-315265 | * | 5/2000 |

OTHER PUBLICATIONS

"Aggregation of Activities to Work Flow States", IBM Technical Disclosure Bulletin, Mar. 1992, US, vol. 34, isssue 10A, p. 445-446, retrieved from EAST search Jun. 14, 2006.*
Borchers, Jan O; "A Pattern Approach to Interaction Design", p. 359-376, Al & Sco (2001) 15:359-376, s002 Springer-Verlag London Limited, retrieved from scholar.google.com Jun. 15, 2006.*
Vessy, Iris; Conger, Sue A. "Requirements Specification: Learning Object, Process and Data Mehodologies", p. 102-113, May 1994, ACM, retrieved from IEEE Oct. 13, 2005.*

(Continued)

*Primary Examiner*—Mary Steelman
(74) *Attorney, Agent, or Firm*—Holland & Knight LLP; Kenneth F. Kozik (57) ABSTRACT

Systems and techniques to facilitate construction of software applications may use patterns that represent generic processes, objects, user interfaces, and content. In general, in one implementation, the technique includes identifying requirements for a desired application and identifying pattern types corresponding to the identified requirements. The pattern types may be selected from process patterns, user interface patterns, and generic object patterns. Patterns that best match the identified requirements may be selected from a set of available patterns, and the selected patterns may be configured according to the identified requirements to produce an application.

37 Claims, 8 Drawing Sheets

OTHER PUBLICATIONS

Kobayashi, Takashi; Ogoshi, Shoko; Komoda, Norihisa; "A Business Process Design Method for Applying Workflow Tools—Using the Concept of Business Process Design Pattern", p. 2314-2319, 1997 IEEE, retrieved from google.com Jun. 15, 2006.*

S. Hayward, Gartner Research, Technology, T-19-4028, New Applications Emerge—Business Process Fusion, pp. 1-5, Mar. 4, 2003.

Phios Corporation, New Tools for Managing Business Processes, pp. 1-19, Mar. 1999.

Thomas W. Malone, Kevin Crowston, Jintae Lee, Brian Pentland, Chrysanthos Dellarocas, George Wyner, John Quimby, Charles S. Osborn, Abraham Bernstein, George Herman, Mark Klein, and Elissa O'Donnell, Tools for inventing organizations: Toward a handbook of organizational processes, pp. 1-24, Center for Coordination Scient, Massachusetts Institute of Technology, Mar. 1999.

Thomas W. Malone, Kevin Crowston, Jintae Lee, Brian Pentland, Chrysanthos Dellarocas, George Wyner, John Quimby, Charles S. Osborn, Abraham Bernstein, George Herman, Mark Klein, Journal of the Institute for Operations Research and the Management Sciences, Tools for Inventing Organizations: Toward a Handbook of Organizational Processes, vol. 45, No. 3, pp. 425-443Mar. 1999.

* cited by examiner

PATTERN-BASED SOFTWARE DESIGN

BACKGROUND

The following description relates to application design, and more particularly to producing software applications for enterprise management systems and techniques.

Recent developments in enterprise management systems have attempted to integrate multiple legacy systems, typically found in existing heterogeneous information technology (IT) environments, into a common enterprise management solution. Such integration technologies frequently fail to deliver a fully integrated platform that also provides sufficient flexibility to adjust to rapidly changing enterprise environments.

Technologies that provide an integrated enterprise management solution can require significant design and implementation resources, and customizing such solutions to the particular needs of various enterprises can further delay the ultimate realization of a complete solution. In many cases, by the time a customized solution for supporting specialized management functions can be delivered, the enterprise will have evolved to a point that the solution is obsolete or the situation to be addressed by the solution is no longer present.

SUMMARY

The present application describes systems and techniques relating to facilitating the construction of applications using patterns. The present inventors recognized that conventional application design processes require significant development efforts. Accordingly, the inventors developed pattern-based software design systems and techniques that allow software applications to be developed in part, if not primarily, through a selection and configuration of pre-existing patterns.

In one aspect, an application may be developed by identifying requirements for a desired application and identifying pattern types that correspond to the identified requirements. The pattern types may be selected from process patterns, user interface patterns, and generic object patterns. Patterns that best match the identified requirements may be selected from a set of available patterns, and the selected patterns may be configured according to the identified requirements to produce an application.

Implementations may include one or more of the following features. For example, additional requirements may be gathered based on a structure provided by the selected patterns, and the gathered requirements may be combined with the selected patterns to produce the application. The selected patterns may include process patterns at different levels of a process pattern hierarchy. The process pattern hierarchy may include business process patterns, work process patterns, and action patterns. The generic object patterns may include collaboration object patterns, business object patterns, and business role object patterns. The user interface patterns may include personal support patterns, execution framework patterns, and activity patterns.

Patterns that best match the identified requirements may be selected from a set of available patterns by determining if a work process pattern is available for satisfying the identified requirements, and constructing a work process using action patterns if a work process pattern that satisfies the identified requirements is not available. Content patterns that correspond to the identified requirements may also be identified and configured.

The patterns may be selected from a library of patterns that includes two or more different types of patterns (e.g., process patterns, object patterns, user interface patterns, and content patterns), and a user may select patterns from the library of patterns. The library of patterns may include process patterns at a plurality of discrete levels of a process pattern hierarchy. A procedure may be constructed from lower level process patterns when a higher level process pattern that satisfies the identified requirements is unavailable. For example, the discrete levels of the process pattern hierarchy may include business process patterns, work process patterns, and business action patterns. The identified requirements may be mapped to available patterns by first mapping the requirements to a corresponding business process pattern, if available. Requirements for which a business pattern is not available may be mapped to a corresponding work process pattern, if available, and requirements for which a work process pattern is not available may be mapped to a corresponding business action pattern, if available.

Collaboration needs and job roles that correspond to a work process pattern to which the identified requirements are mapped may be identified, and requirements may be mapped to patterns relating to collaboration functions and job role functions. The business process patterns may represent an application scenario, the work process patterns may represent guided procedure templates, and the business action patterns may represent guided procedure steps. A job role associated with a process pattern may be identified. The job role may be segmented into work roles, and the work roles may be mapped to content patterns and user interface patterns. The content patterns and user interface patterns may be selected according to a work style associated with the work role and a role content for the work role. Work scenarios associated with the work role may be identified, and the work scenarios may be mapped to execution framework and activity user interface patterns.

The selected patterns may be used to identify additional requirements for the software application. Work roles to be supported by the software application may be identified, and a work style and a role content associated with each work role may also be identified. Content patterns and user interface patterns that correspond to the identified work style and role content may then be selected and configured.

The patterns may include business action patterns that define guided procedure steps; work process patterns that define guided procedure templates, with each work process pattern constructed from business action patterns; and business process patterns that define a generic application scenario, with each business process pattern constructed from work process patterns. The patterns may further include business object patterns, user interface patterns, and content patterns that are accessible for use in constructing the application by configuring selected business object patterns, user interface patterns, and content patterns according to identified requirements for the application. The patterns may also include collaborative content patterns for defining generic collaborative structures. The collaborative content patterns may also be accessible for use in constructing the application by configuring the collaborative content patterns according to identified requirements for the application. The patterns may include user-centric patterns such as work style content patterns for defining generic work style contents that relate to factors that drive different users' work and role content patterns for defining generic roles that can be assigned to different users. The user-centric patterns may include patterns relating to work scenarios for roles that can be assigned to different users.

In another aspect, a job role within an enterprise maybe identified. The job role may be segmented into work roles associated with the job role, and each work role may be mapped to a work style content pattern and/or a role content pattern. Work scenarios associated with each work role may also be identified, and each work scenario may be mapped to work scenario user interface patterns.

Implementations may include one or more of the following features. For example, personal resource pages may be configured, based on the work style content pattern, in accordance with a personal support user interface pattern. The work scenario user interface patterns may include execution framework patterns and activity patterns. A work process associated with a work scenario may be identified, and each work scenario may be mapped to a work process pattern corresponding to the identified work process.

In another aspect, a set of requirements for a business process application may be identified, and the identified requirements may be mapped to a work process pattern that represents a guided procedure template for a work process. A plurality of job roles associated with the work process pattern may be identified. Each job role may be segmented into work roles, and the work role may be mapped to a set of content patterns and user interface patterns.

Implementations may include one or more of the following features. For example, collaboration needs associated with the work process may be identified based on the identified requirements, and a collaborative content pattern corresponding to the identified collaboration needs may be selected. The collaboration needs may be mapped to the selected collaborative content pattern.

In yet another aspect, a job role in an enterprise may be segmented into work roles. A plurality of personal support user interface patterns may be configured in accordance with work styles associated with the identified work roles to produce personal support pages. Each personal support user interface pattern may corresponds to a work style. A plurality of work scenarios associated with the work roles may be identified, and each work scenario may be maped to user interface patterns relating to execution modes to produce an execution framework page. Each personal support page may contain links to the execution framework pages.

Implementations may include one or more of the following features. For example, work activities associated with each work scenario may be identified, and each work activity may be mapped to a corresponding activity pattern to create activity pages. Each execution framework page may contains link to selected activity pages, and the activity pages may relate to specific activities within the execution framework.

The described techniques may be implemented in a system, method, or as a set of instructions stored on a machine-readable medium and operable to cause one or more machines to perform certain operations.

DETAILED DESCRIPTION

Figure 1:
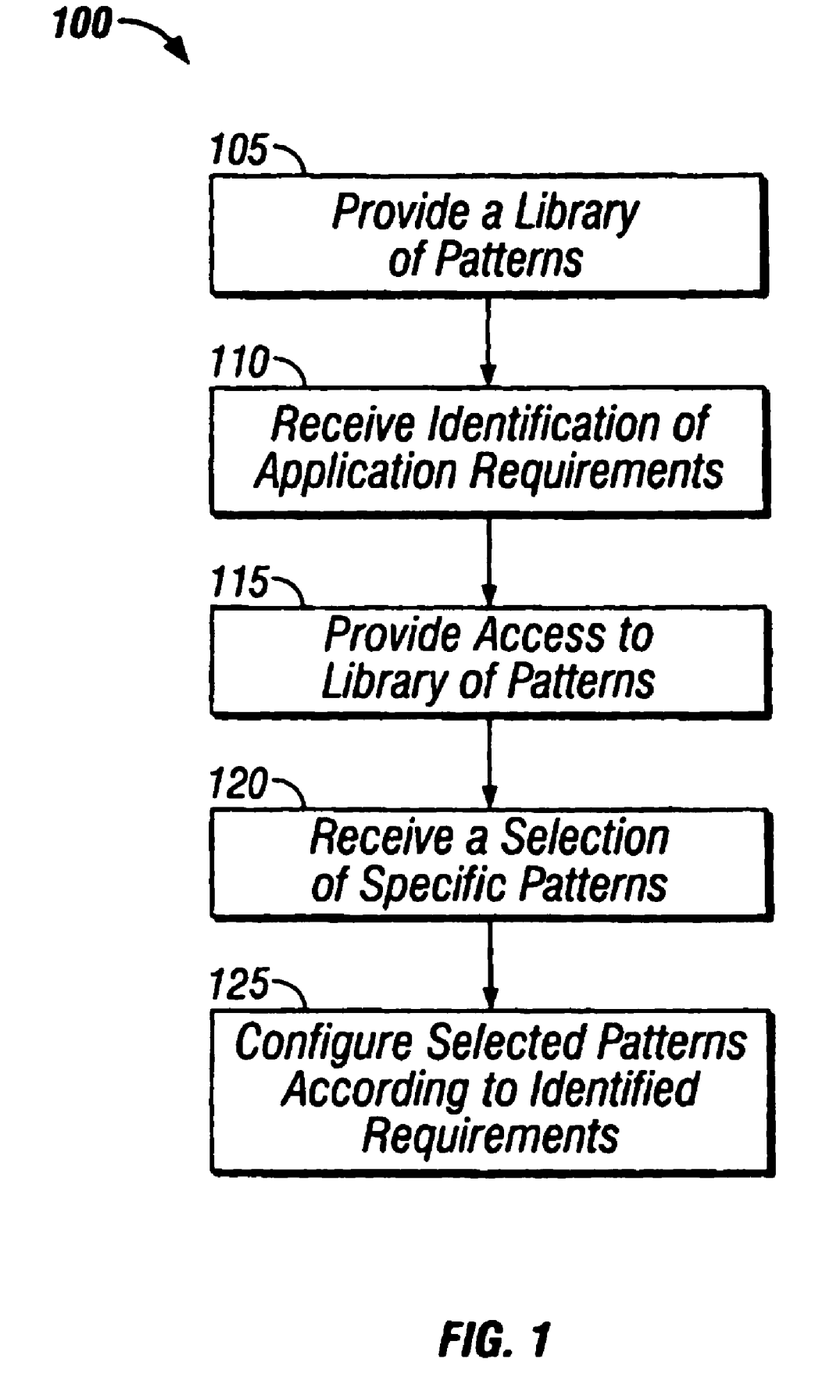
FIG. 1 is a flow diagram of a process for developing an application using patterns.

In accordance with the described techniques, applications can be designed by making the best possible use of patterns to construct an application rather than designing the components of the application from scratch. FIG. 1 is a flow diagram of a process 100 for developing an application using patterns. A library of patterns is provided (step 105). The patterns may include process patterns, object patterns, user interface patterns, and content patterns. The patterns may represent generic building blocks for an application. An identification of requirements for the application to be developed is received (step 110) from an application designer. Access to the library of patterns is provided to the application designer (step 115). A selection by the application designer of specific patterns is received (step 120). In general, the specific patterns may be selected according to which patterns best match the application requirements. The selected patterns are then configured according to the identified requirements (step 125) to produce an application. By constructing an application from patterns, the amount of development work can be greatly reduced, and the application development process can be reduced to a selection and configuration of predefined patterns.

Figure 2:
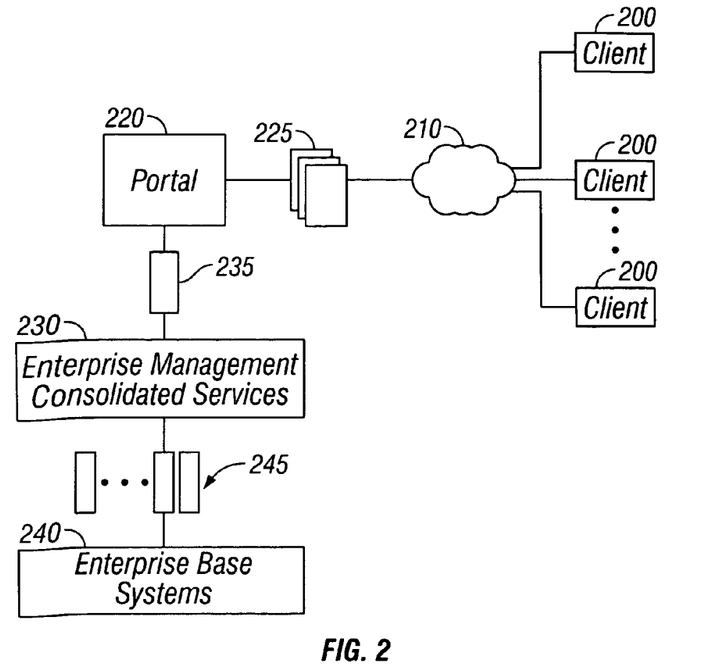
FIG. 2 is a block diagram illustrating an example of an integrated enterprise management system.

FIG. 2 is a block diagram illustrating an example integrated enterprise management system. Multiple clients 200 can access data over a network 210 through a portal 220. The network 210 can be any communication network linking machines capable of communicating using one or more networking protocols, e.g., a local area network (LAN), a wide area network (WAN), an enterprise network, a virtual private network (VPN), and/or the Internet. The clients 200 can be any machines or processes capable of communicating over the network 210. The clients 200 can be Web Browsers and optionally can be communicatively coupled with the network 210 through a proxy server (not shown).

A portal 220 provides a common interface to program management services. The portal 220 receives requests from the clients 200 and generates information views 225 (e.g., Web pages) in response. The portal 220 can implement a user roles-based system to personalize the common interface and the information views 225 for a user of a client 200. A user can have one or more associated roles that allow personalized tailoring of a presented interface through the generated information views 225.

The portal 220 communicates with an enterprise management system 230 that consolidates multiple application services. The portal 220 receives data 235 from the enterprise management system 230 for use in fulfilling the requests from the clients 200. The enterprise management system 230 can provide integrated application services to manage business objects and processes in a business enterprise. The business objects and processes can be resources (e.g., human resources), development projects, business programs, inventories, clients, accounts, business products, and/or business services.

The enterprise management system 230 communicates with enterprise base systems 240 to obtain multiple types of data 245. The enterprise base systems 240 can include various existing application services, such as human resource management systems, customer relationship management systems, financial management systems, project management systems, knowledge management systems, business warehouse systems, time management systems, and electronic file and/or mail systems. The enterprise base systems 240 also can include an integration tool, such as the eXchange Infrastructure provided by SAP, that provides another level of integration among base systems. The enterprise management system 230 can consolidate and integrate the data and functionality of such systems into a single enterprise management tool.

This enterprise management tool can include systems and techniques to facilitate creation of new applications within the enterprise management system 230. These new applications, referred to as cross-functional or composite applications, can readily draw on the resources of the enterprise base systems 240 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 230 using customized cross-functional applications. The stages can provide and consume determined services that can be integrated across multiple disparate platforms.

The portal 220, enterprise management system 230 and enterprise base systems 240 can reside in one or more programmable machines, which can communicate over a network or one or more communication busses. For example, the base systems 240 can reside in multiple servers connected to an enterprise network, and the portal 220 and the enterprise management system 230 can reside in a server connected to a public network. Thus, the system can include customized, web-based, cross-functional applications, and a user of the system can access and manage enterprise programs and resources using these customized web-based, cross-functional applications from anywhere that access to a public network is available.

Figure 3:
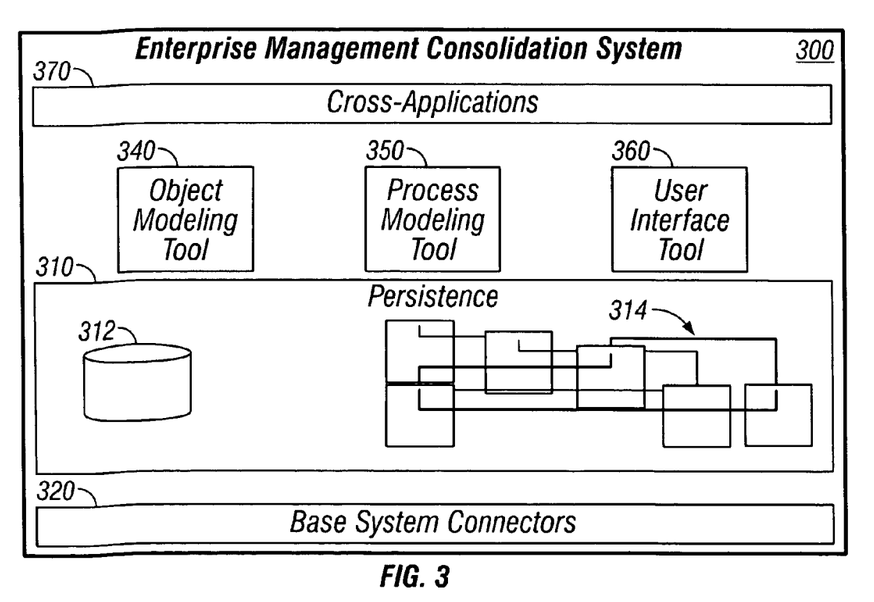
FIG. 3 is a block diagram illustrating components of an example enterprise management consolidation system.

FIG. 3 is a block diagram illustrating components of an example enterprise management consolidation system 300. The system 300 can include a persistence layer 310 and one or more base system connectors 320. The base system connectors 320 enable data exchange and integration with base systems. The base system connectors 320 can include a BC (Enterprise Connector) interface, an ICM/ICF (Internet Communication Manager/Internet Communication Framework) interface, an Encapsulated PostScript® (EPS) interface, or other interfaces that provide Remote Function Call (RFC) capability.

The persistence layer 310 provides the enterprise management consolidation system 300 with its own database 312 and data object model 314. The database 312 and the object model 312 provide a consolidated knowledge base to support multiple enterprise management functions, including functions created as cross-applications 370. Active communication between the persistence layer 310 and the base systems can provide a tight linkage between real-time operational data from multiple base systems and an integrated enterprise analysis tool to allow strategic enterprise management and planning.

The data object model 314 can represent a subset of data objects managed by the base systems. Not all of the data aspects tracked in the base systems need to be recorded in the data object model 314. The data object model 314 may have defined relationships with data objects stored in the base systems, for example, certain objects in the data object model 314 may have read-only or read-write relationships with corresponding data objects in the base systems. These types of defined relationships can be enforced through the communication system built between the persistence layer 310 and the base systems. Thus, the persistence layer 310 can be used to effectively decouple application development from the underlying base systems.

The cross-functional applications 370, which take advantage of this decoupling from backend systems to drive business processes across different platforms, technologies, and organizations, can be created using a set of tools that enable efficient development of cross-functional applications 370. The cross-functional applications 370 can support semi-structured processes, aggregate and contextualize information, handle event-driven and knowledge-based scenarios, and support a high degree of collaboration in teams, including driving collaboration and transactions. The set of tools enable efficient development of the cross-functional applications 370 by providing application patterns that support model-driven composition of applications in a service-oriented architecture.

An object modeling tool 340 enables creation of new business objects in the persistency layer 310 by providing a mechanism to extend the data object model 314 dynamically according to the needs of an enterprise. A process modeling tool 350 enables creation of new business workflow and ad hoc collaborative workflow. A user interface (UI) tool 360 provides UI patterns that can be used to link new objects and workflow together and generate standardized views into results generated by the cross-functional applications 370. The object modeling tool 340, the process modeling tool 350 and the UI tool 360 thus can be used to build the components of cross-applications 370 to implement new enterprise management functions without requiring detailed coding activity.

The process modeling tool 350 can include guided procedure templates with pre-configured work procedures that reflect best practices of achieving a work objective that is part of a larger cross-functional application scenario. Such a work procedure can include contributions from several people, creation of multiple deliverables, and milestones/phases. Moreover, whenever an instantiated business object or work procedure has lifetime and status, the progress and status of the object or work procedure can be made trackable by the process owner or by involved contributors using a dashboard that displays highly aggregated data. The dashboard and a myOngoingWork place can be two UI patterns that are provided by the UI tool 360.

Whenever there is a concept of myObjects, myRecentObjects, myRelatedObjects or myPreferredObjects, then an Object Picker UI pattern, provided by the UI tool 360, can be included that let users pick their favorite object directly. Whenever people are to be searched for, either for choosing one individual person or for generating a collection of people meeting some criterion, the people finder concept should be applied. A key aspect of searching for a person can be described as an attribute within the user's activity, qualification, interest, and collaboration profile. For a given cross-application scenario, people collections can be stored as personal or shared collections using the People Finder to make them available for further operations later on.

Whenever there is a strategic view on a cross-functional application scenario, analytics of the overall portfolio can be made available in the form of a collection of UI components. A view selector can be used to display/hide components, and a component can be toggled between graphical and numerical display and can include a drop-down list or menu to select sub-categories or different views.

Cross-functional application scenarios can provide related information to the user when possible, and some parts within a larger cross-application scenario can define what kind of related information is to be offered. Heuristics can be used to identify such relatedness, such as follows: (1) information that is related to the user due to explicit collaborative relationships such as team/project membership or community membership; (2) information that is similar to a given business object in a semantic space based on text retrieval and extraction techniques; (3) recent objects/procedures of a user; (4) other people doing the same or similar activity (using same object or procedure template, having same workset); (5) instances of the same object class; (6) next abstract or next detailed class; (7) explicit relationships on the organizational or project structure; (8) proximity on the time scale; (9) information about the underlying business context; and/or (10) information about the people involved in a collaborative process.

Cross-functional applications also can include generic functionality in the form of ControlCenter Pages that represent generic personal resources for each user. These cross-applications can refer to the following pages where appropriate: (1) MyOngoingWork page: provides instant access to all dashboards that let users track their ongoing work. Ongoing work may refer to the state of business objects as well as guided procedures. (2) MyDay page: lists today's time based events that are assigned or related to the user. (3) MyMessageCenter page: Displays all pushed messages and work triggers using a universal inbox paradigm with user selected categorical filters. (4) MyInfo: Provides access to all personal info collections (documents, business objects, contacts) including those located in shared folders of teams and communities of which the user is a member. Also provides targeted search in collaborative information spaces such as team rooms, department home pages, project resource pages, community sites, and/or personal guru pages.

Customized cross-functional applications can be constructed using patterns that are stored in an enterprise management consolidation system 300. Patterns can provide a framework for enforcing certain rules or implementing previously identified best practices for, e.g., modeling objects, interfacing with users, presenting information, and performing tasks, activities, or business functions. The patterns can include process patterns, UI/application patterns, generic object patterns, and content patterns. Process patterns represent knowledge of the best business and work practices for implementing processes in an enterprise. UI patterns represent design solutions for providing interactive user displays relating to common work tasks or activities. Generic object patterns provide model abstractions of business or collaborative entities. Content patterns represent reusable packages of business services and designs that define generic roles, taxonomies, and the like. Content patterns may represent a collection of other types of patterns (i.e., process patterns, UI patterns, and object patterns), along with additional functionalities and information, that relate to a particular role, work style, or type of collaborative environment.

Each different pattern type (i.e., process patterns, content patterns, UI patterns, etc.) includes patterns that fall into different discrete levels of a pattern hierarchy. The higher levels in the hierarchy define more abstract processes, while the lower levels define increasingly specific processes. For example, process patterns can include business process patterns that define common cross-application scenarios, work process patterns that represent guided procedure templates, and business service patterns and ad hoc workflow patterns that each define guided procedure steps. Generally, business process patterns represent a collection of work process patterns and define interactions between the work process patterns. Work process patterns represent more specific procedures that may be used as part of an overall business process to perform more specialized functions. Work process patterns include a collection of business service patterns and/or ad hoc workflow patterns and define interactions between and among the business service patterns and/or ad hoc workflow patterns. Business service patterns and/or ad hoc workflow patterns represent more specific actions or steps that may be used as part of an overall work process or business process.

Common cross-application scenarios, which represent generic business processes, may include, for example, a product launch scenario that includes a basic process for launching a new product, a project resource management scenario that includes a basic process for managing resources in connection with a project, and a merge organizations scenario that includes a basic process for managing the logistics of merging the operations of two or more organizations. Guided procedure templates, which represent generic work processes, may include, for example, a plan budget template, a review and tune portfolio template, a create cost center template, a rollout strategy and monitor execution template, and a staff project template. Other cross-application scenarios and guided procedure templates may also be used as patterns for constructing other business processes and work processes, respectively.

Guided procedure steps represent actions that may be assembled to produce a guided procedure. Guided procedure steps that represent business service patterns may include steps of placing an order, booking a resource (e.g., reserving a shared resource), requesting a service, creating a simple quote, or purchasing a product or service. Guided procedure steps that represent ad hoc workflow patterns may include steps of asking for opinions, making an announcement (e.g., announcing completion of a sub-process, announcing availability of a shared resource, and the like), preparing a meeting, requesting a contribution, confirming a due date, or asking for details. Other guided procedure steps may also be used as patterns for use in constructing business processes and work processes.

Generic object patterns can include collaboration objects that define knowledge management specialized objects, personal profile objects that define various characteristics of an employee, core business objects that define generic objects in the persistence layer 310, and business role objects that define workflow roles. According to the generic object patterns, collaboration objects may have predefined relationships with personal profile objects core business objects, and business role objects. Similarly, personal profile objects may have predefined relationships with core business objects and business role objects.

Collaboration objects may represent, for example, a team, community, task, person, personal network, or meeting. Personal profile objects may represent, for example, activities, qualifications, interests, and collaborative environments associated with an individual. Core business objects may represent, for example, a project, resource, order, customer, business partner, milestone or gate, product concept, product, tool or method, region, or market. Business role objects may represent, for example, a boss, office assistant, trusted expert, team member, approver, or mentor role.

User interface patterns can include personal support patterns, execution framework patterns, and activity patterns that each define a pattern for a page and task patterns that define a pattern for a component of a page. Page support patterns may have links to execution framework patterns and may present overview and monitoring components whose contents are assembled from the execution frameworks. Execution framework patterns may link to activity patterns that provide user interface patterns for performing more specific activities. All of the various page patterns may be constructed from component patterns representing individual tasks that can be performed from the page.

Personal support patterns can include myWorkOverview, myDay, myMessages, myOngoingWork, myInfoCollections, and myServices pages. Execution framework patterns can include page patterns that focus on personal work, such as creating a work context (i.e., a hybrid collection of various resource items such as documents, people, web pages); team work, such as coordinating activities, sharing information, or meeting and discussing projects, tasks, concepts and the like; procedural frameworks, such as working along a checklist or roadmap, tracking deliverables, or tracking pending requests; and objects, such as inspecting, modifying, or creating a business object. Activity patterns can include page patterns for watching a process, inspecting an object, browsing and collecting objects or information, configuring an object or process from existing resources, overseeing people, modifying or creating structures, or submitting an inquiry for information. Task patterns can include component patterns for searching, selecting an object, choosing a candidate, assigning a task, project, process, and the like to an object, or creating a collection.

Content patterns can relate to an individual user, such as role patterns and work style patterns, or to a collaborative structure, such as workgroup patterns, community patterns, or information spaces. Role patterns are generally used to define a workset, which is a collection of pages, objects, and processes that provide a complete description of a particular work role. Different role patterns may be used for a process watcher, a people manager, and a project leader. Work style patterns are generally used to configure ControlCenter pages and content. Different work style patterns may be used for ControlCenter pages that are workflow driven, calender driven, email driven, exception driven, and analytics driven.

Collaborative content patterns provide a pre-configured collaboration room that are designed for specific types of collaboration. Workgroup patterns represent team room templates and can include patterns for a service team, task force, senior management team, or engineering team. Community patterns represent community templates and can include patterns for interest-based communities, activity-based communities, communities of people that use the same tools and methods, or communities that use the same business object or context. Information space patterns represent company network templates and can include guru pages (e.g., a user homepage that provides information, for access by others, about a subject in which the user has some expertise), a team homepage, a department homepage, and a community page.

Content patterns or templates for collaborative structures may be designed accordingly to the type of collaborative structure (i.e., personal networks, ad-hoc teams, project teams, on-going teams, multiple teams, departments, communities, or business networks) and the subject matter of the collaborative structure (e.g., implementation team, product launch initiatives team, sales team, engineering team, service team, management team, trading club, or supplier network). The design of the various content patterns may be influenced by whether the team's primary mission is problem-solving, creative, or tactical. For example, a problem-solving team, such as a service team, may require greater focus on sharing of information, ideas, questions, and solutions, while a tactical team, such as an engineering team, may require greater focus on workflow and maintaining discrete areas of responsibility. Different types of teams may also require different lower level content. A management team room template and a sales team room template, for example, may both include shared folders and a shared calendar, but the content of the shared folders and the shared calendar may be different.

Content patterns for collaborative structures may include multiple different content areas, such as a status space, a private space, a space that provides general information about the collaborative entity, a knowledge space, and a space that is semi-public (i.e., accessible by everyone within the enterprise). At the user level, for example, a content pattern may include a status space that contains information about the user's activities, a private space that represents the user's personal workplace, a general information space that includes a user profile, and a knowledge space that represents a guru page. At the team and community level, a content pattern may include a team status or community executive summary, a private team or strategic community workplace, a homepage, a page with links toresources or other information identifying resources, and a semi-public community place.

Figure 4:
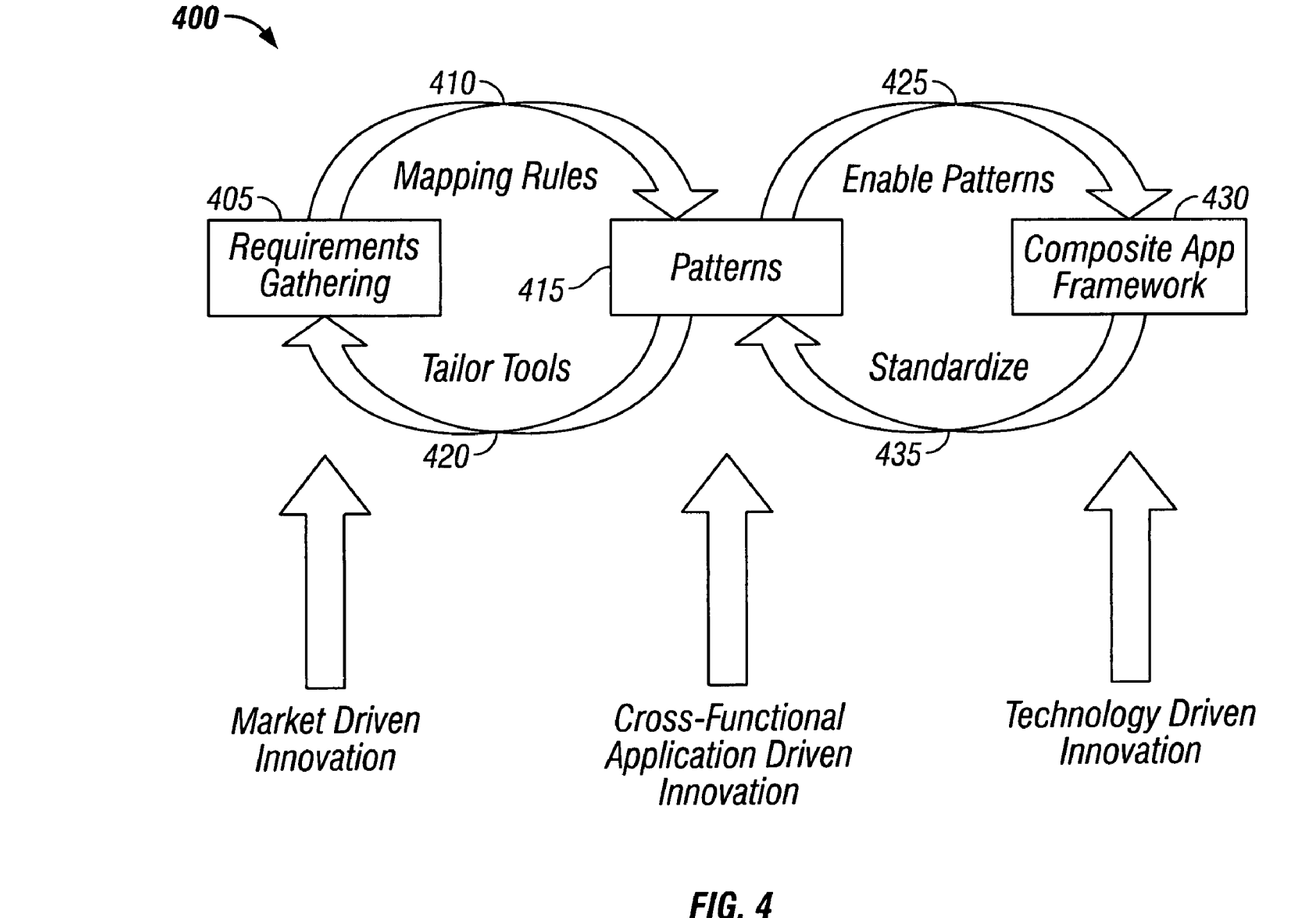
FIG. 4 is a schematic overview of a process for constructing a customized cross-functional application.

FIG. 4 depicts a schematic overview of a process 400 for constructing a customized cross-functional application. The process 400 allows an application developer to drastically reduce the amount of new development by using existing patterns to construct a customized application. The task of creating a new application thereby becomes more of an identification and configuration of predefined patterns than a development effort. Patterns may be identified and configured iteratively at different hierarchical levels, with respect to different types of patterns (e.g., to define processes, objects, user interfaces, and content), and/or for different focuses (e.g., from a user point of view and from a process point of view).

To develop a cross-functional application, requirements for the application are gathered (step 405). The gathering of requirements is driven by the needs of the market or of a particular end user. At an abstract level, requirements gathering involves identifying the basic purposes and functions of the application. Requirements may subsequently be gathered for more detailed functions, operations, and capabilities to be included in the application.

The identified requirements are then mapped to patterns (step 410) by first matching the requirements to a pattern type and then looking for the predefined patterns 415 of that type that best match the requirements. Accordingly, an application designer first determines whether a particular requirement or set of requirements relate to a process, object, user interface, or content and then browses through a library of available patterns of that type to select a pattern that best matches the requirements. Once a pattern is selected, the identified requirements are combined into the pattern. The patterns that are available in the library may be driven by the existence of similar, previously developed cross-functional applications.

The selected patterns, or other patterns in the library, can be used to tailor and optimize the process of gathering requirements according to the available patterns (step 420). For example, the available patterns may provide a roadmap or other guidance for identifying additional requirements that may be necessary to configure the patterns (e.g., the components of a selected process pattern may remind the application designer to gather requirements for particular types of objects that are generally used in connection with that process).

To create an application, the selected patterns may be enabled or implemented in accordance with a particular underlying technology (step 425) to create a composite application framework 430, the development of which may be driven by the particular underlying technology that is used. Aspects of the composite application framework 430 may then be standardized to create new or additional patterns (step 435) for use in future cross-functional applications.

Figure 5:
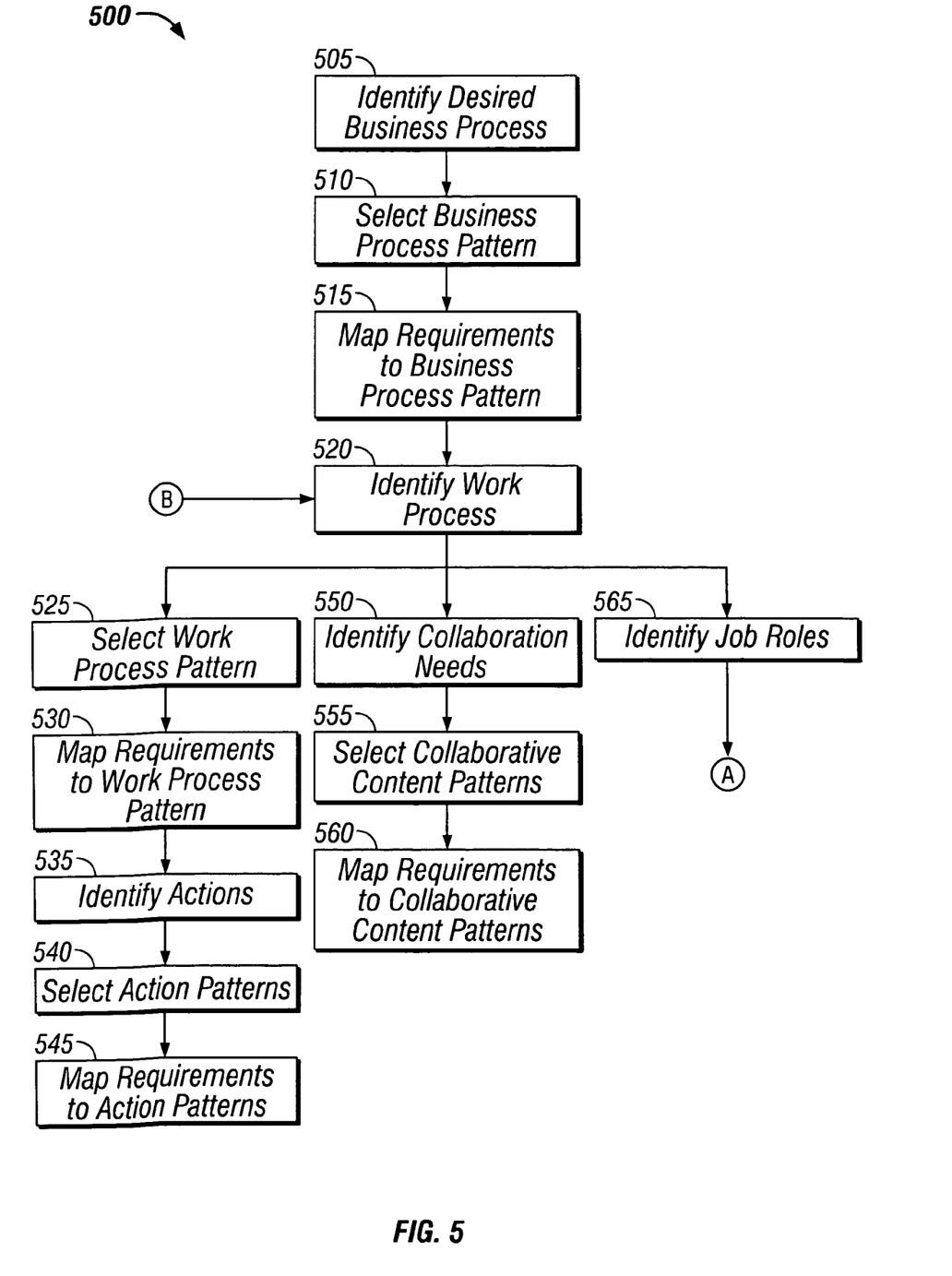
FIG. 5 is a flow diagram of a process for using patterns to develop process-centric aspects of an application.

FIG. 5 is a flow diagram of a process 500 for using patterns to develop process-centric aspects of an application. In accordance with the process 500, an application designer first identifies a desired business process (step 505). A library of patterns is then searched to select a business process pattern, if available, that corresponds to the identified process pattern (step 510). Requirements for the application are mapped to the selected business process pattern (step 515). The business process pattern might provide a relatively complete definition of the business process or might merely define a general framework for constructing the business process from lower level patterns. Generally, however, additional lower level process components are necessary to define the business process.

Accordingly, work processes within the overall business process are identified (step 520), and corresponding, predefined work process patterns (i.e., guided procedure templates) are selected (step 525). Requirements for the application are mapped to the selected work process patterns (step 530). The work process patterns define a lower level of an overall process hierarchy than the business process patterns. For example, one or more work process patterns may exist for performing an organizational restructuring. The organizational restructuring work process may be included in a number of different business processes, such as a merger, a bankruptcy, or an implementation of a new strategic plan. As another example, a business process may be implemented for managing a product innovation. One of the work processes needed to implement the overall business process may be a "concept evaluation" process. The application designer could map the application's requirements for the work process to a guided procedure template that represents a generic concept evaluation procedure. The work process patterns may provide relatively complete definitions of the corresponding work processes or may merely define a general framework for constructing the work processes from lower level patterns. Generally, however, additional lower level process components are necessary to define the work process.

Accordingly, actions within each broader work process are identified (step 535), and corresponding, predefined action patterns (i.e., guided procedure steps relating to business services or ad-hoc workflow elements) are selected (step 540). Requirements for the application are mapped to the selected action patterns (step 545). The action patterns define a lower level of the overall process hierarchy than the work process patterns. Thus, the actions represent more specific steps that can be grouped to perform a procedure. The process hierarchy may include even lower level process patterns that represent more specific process steps.

In addition to selecting and configuring the various hierarchical levels of process patterns, collaboration needs for the work processes identified at step 520 are identified (step 550). Collaborative content patterns that correspond to the identified collaborative needs are selected (step 555), and the appropriate application requirements are mapped to the selected collaborative content patterns (step 560). Job roles for the work processes identified at step 520 may also be identified (step 565). Defining the identified job roles is performed using patterns that relate to a more user-centric part of the overall application design process. Although FIG. 5 depicts identifying collaborative needs and job roles based on the identified work processes, collaborative needs and job roles may also be identified at other levels of the process hierarchy.

Figure 6:
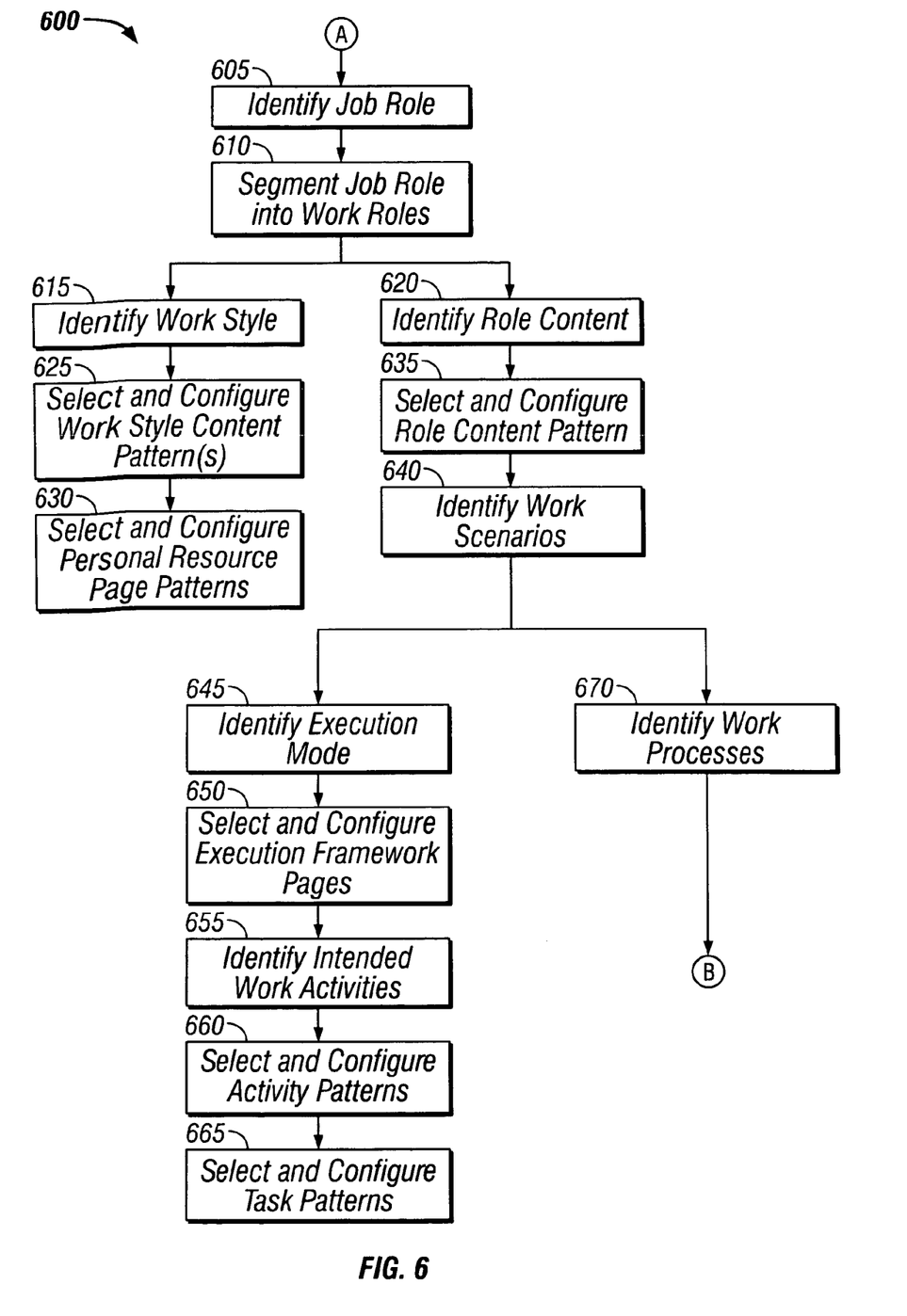
FIG. 6 is a flow diagram of a process for using patterns to develop user-centric aspects of an application.

FIG. 6 is a flow diagram of a process 600 for using patterns to develop user-centric aspects of an application. For example, the process 600 may be used to build a workset for a user. A workset provides a complete description of a work role and can include a list of work scenarios, objects, and interests. Initially, a job role is identified (step 605). The job role may be segmented into a number of work roles (step 610). For example, a person with a job title (i.e., job role) of salesperson may have a number of smaller responsibilities (i.e., work roles), such as account manager and market researcher. The account manager and market researcher responsibilities may have their own respective worksets that contain all of the tools, user interfaces, and information for use with the account manager role and for use with the market researcher role.

For each work role, a work style is identified (step 615) and role content needs are identified (step 620). The identification of a work style involves determining whether the work role is, for example, workflow driven, calendar driven, email driven, exception driven, or analytics driven, which can affect the content and user interface considerations for the work role. Thus, the work style relates to what type of interaction drives work performed by an actor in the role. The identification of the role content needs involves determining whether the actor in the role is, for example, a process watcher, a people manager, or a project leader, which can also affect the content and user interface considerations for the work role. Thus, the role content relates to what the actor does with the information received in that role.

Based on the identified work style, a work style content pattern is selected and configured by mapping appropriate application requirements to the selected work style content pattern (step 625). Personal resource page patterns are also selected and configured by mapping appropriate application requirements to the selected personal resource page patterns (step 630). Based on the identified role content needs, role content patterns are selected and configured by mapping appropriate application requirements to the selected role content pattern (step 635).

Work scenarios (i.e., probable or necessary specific uses of the application) for the role are identified (step 640) based on the identified role content. For example, specific work scenarios may be designed for a project manager, while other scenarios my be applicable for a project contributor (i.e., a person that contributes ideas or services to a project). The layout of the user interfaces for different work scenarios may be influenced by two factors, the execution framework, which provides a means for organizing a work context, and the intended work activities.

Execution modes (e.g., whether the scenarios relate to a personal work environment, a team work environment, or a guided procedure work environment) for the identified work scenarios are identified (step 645), and execution framework UI patterns are selected and configured by mapping appropriate application requirements to the selected execution framework pattern (step 650). The intended work activities for the work scenarios are identified (step 655), and activity UI patterns are selected and configured by mapping appropriate application requirements to the selected activity patterns (step 660). Tasks within each broader activity are identified, and corresponding, predefined task UI patterns (i.e., component patterns) are selected and configured by mapping appropriate application requirments to selected task patterns (step 665). The task patterns define a lower level of the overall UI hierarchy than the activity patterns.

In addition to selecting and configuring UI patterns based on the identified work scenarios, work processes for the identified work scenarios are also identified (step 670). Defining the work processes is performed using patterns that relate to a more process-centric part of the overall application design process (see FIG. 5).

Figure 7:
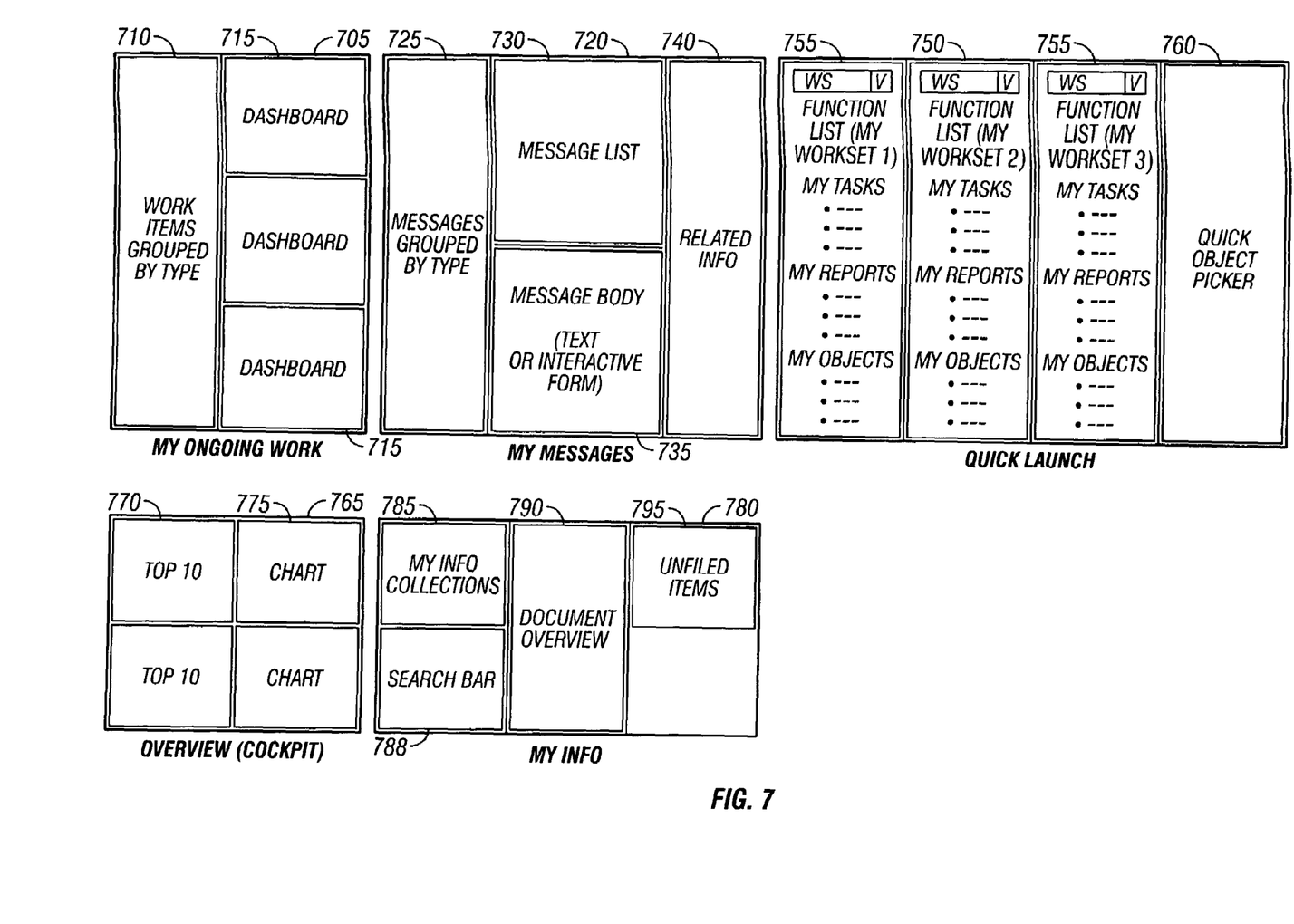
FIG. 7 is an illustration of several example personal support page user interface patterns.

FIG. 7 illustrates several example personal support page UI patterns. Instantiations of the personal support page patterns may be part of a ControlCenter for a user. The personal support page patterns may include a MyOngoingWork pattern 705 that includes an area 710 for listing work items grouped by type and one or more dashboards 715 for displaying information about the work items. A MyMessages pattern 720 can include an area 725 for displaying messages grouped by type, a message list 730, an area 735 for displaying the message body of a selected message, and an area 740 for displaying related information. A QuickLaunch pattern 750 can identify different worksets 755 that each include a listing of tasks, reports, objects, and/or other items that relate to that workset and can include an object picker area 760 for linking to selected objects. An Overview pattern 765 can include areas 770 for listing, e.g., top ten most frequented pages and charts 775 for displaying information in graphical form. A MyInfo pattern 780 can include a listing 785 of the user's information collections, a search bar 788 for searching collections, a document overview area 790 for displaying information about a selected document, and an area 795 for listing unfiled items.

Figure 8:
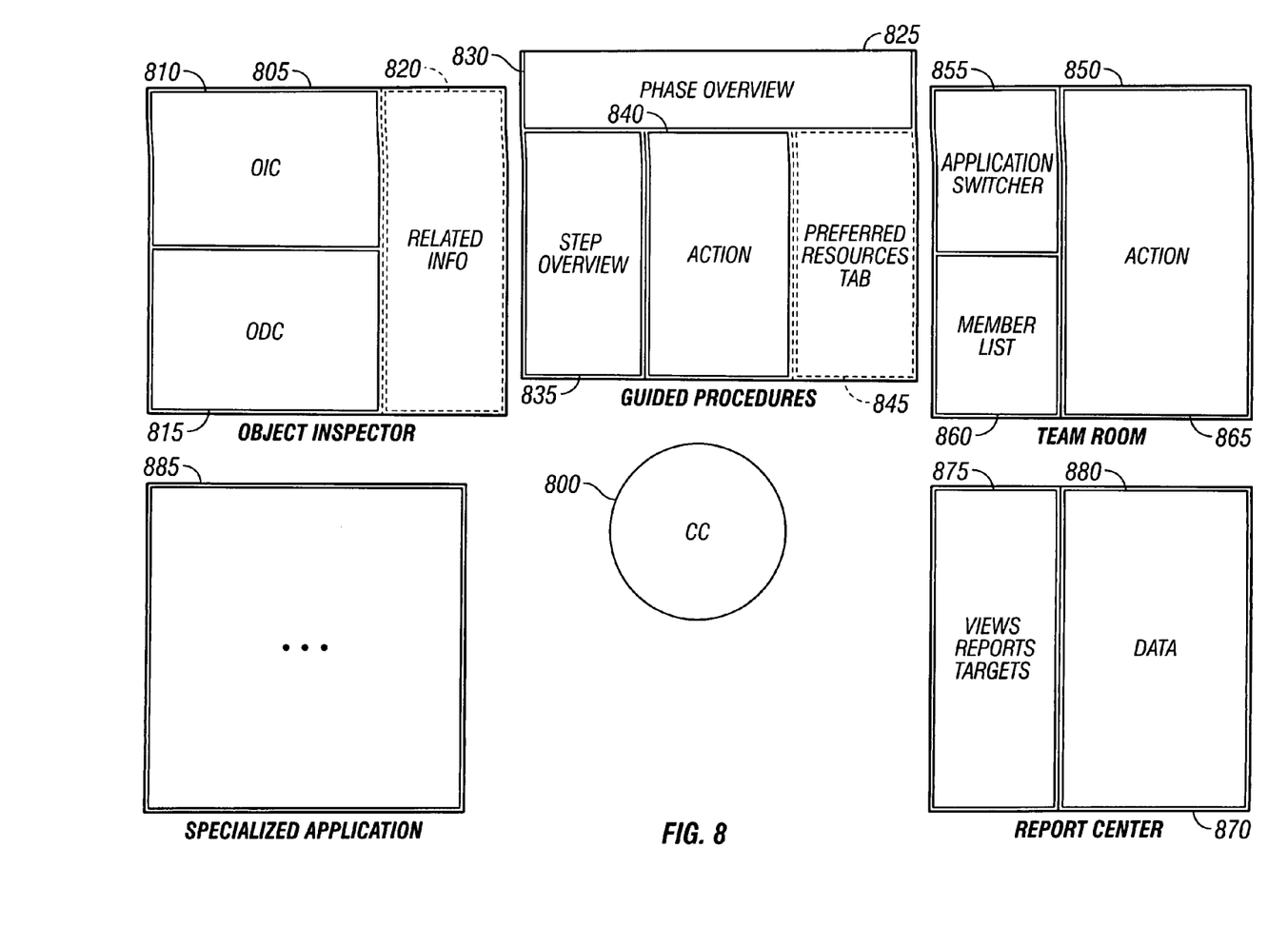
FIG. 8 is an illustration of several example execution framework user interface patterns.

FIG. 8 illustrates several example execution framework UI patterns. Links to instantiations of the execution framework page patterns may be embedded in the ControlCenter (CC) pages 800. The execution framework UI patterns may include an object inspector execution framework pattern 805 that includes an area 810 for displaying an object identification component (OIC), an area 815 for displaying an object data component (ODC), and an area 820 for displaying related information. A guided procedures execution framework pattern 825 may include a phase overview area 830, a step (i.e., a step in the overall procedure or phase) overview area 835, an action area 840 for displaying information about the action currently being performed, and a preferred resources tab 845 for linking to resources that may be useful in performing the action. A team room pattern 850 may include an application switcher area 855 for switching between applications, a member list area 860 for listing members of the team, and an action panel 865 for working on a current action. A report center pattern 870 may include a panel 875 for selecting views, reports, or targets and a data area 880 for displaying a selected report. Other specialized application patterns 885 may also be used.

Figure 9:
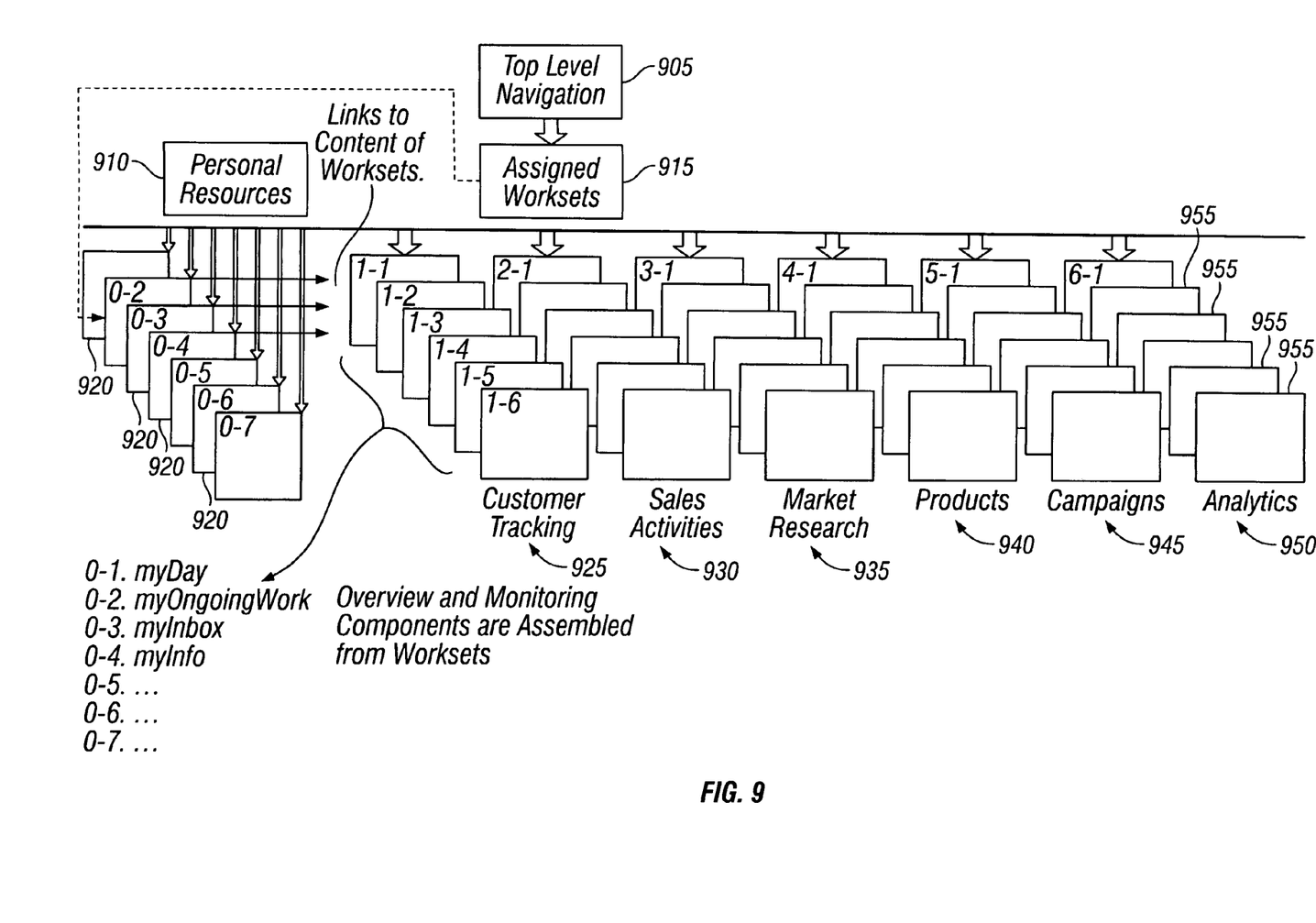
FIG. 9 is a schematic overview of the interaction between personal support pages and worksets.

FIG. 9 is a schematic overview of the interaction between the personal support pages and the worksets. A top level navigation 905 allows a user to select between navigating personal resources 910 or navigating worksets 915. The personal resources 910 may include a number of ControlCenter pages 920 (e.g., myDay, myOngoingWork, myInbox, myInfo pages) that are constructed from the personal resource page UI patterns and that include content from the work style content patterns (see FIG. 6). The assigned worksets 915 may include pages 955 that are constructed from the execution framework patterns and activity UI patterns and that include content from the role content patterns (see FIG. 6). In the illustrated example, the user has worksets for customer tracking 925, sales activities 930, market research 935, products 940, campaigns 945, and analytics 955. The ControlCenter pages 920 provide an overview and monitoring capability for the worksets, such that messages, activities, events, documents, work items, or other specific types of items are assembled from all of the user's worksets and displayed on a single personal support page. For example, a myDay ControlCenter page 920 can display the day's events and work items for all of the user's worksets. Each ControlCenter page 920 can also provide a link for each item listed on the ControlCenter page 920 to a corresponding page in the worksets. Each page in the workset may relate to a particular work scenario. The workset pages may also be organized according to a hierarchy. For example, a top level page in the workset may relate to a particular work scenario, and lower level pages may correspond to increasingly more detailed activities within that work scenario.

Although only a few implementations have been described in detail above, other modifications are possible. For example, various process steps may be performed at many different places within the overall process. In certain implementations, multitasking and parallel processing may be preferable. Other implementations may be within the scope of the following claims.

What is claimed is:

1. A computer-implemented method of developing a software application, the method comprising:
   identifying pattern types corresponding to requirements for the software application to be developed, wherein the pattern types are identified from one or more of process patterns, user interface (UI) patterns, and generic object patterns;
   selecting patterns that best match the requirements from a set of available patterns; and
   configuring the selected patterns according to the requirements and generating the software application.

2. The computer-implemented method of claim 1 further comprising:
   gathering additional software application requirements based on a structure associated with the selected patterns; and
   combining the gathered additional software application requirements with the selected patterns.

3. The computer-implemented method of claim 1 wherein the selected patterns include process patterns corresponding to different levels of a process pattern hierarchy.

4. The computer-implemented method of claim 3 wherein the process pattern hierarchy includes business process patterns, work process patterns, and action patterns.

5. The computer-implemented method of claim 1 wherein the generic object patterns include collaboration object patterns, business object patterns, and business role object patterns.

6. The method of claim 1 wherein the UI patterns include personal support patterns, execution framework patterns, and activity patterns.

7. The computer-implemented method of claim 1 wherein selecting patterns that best match the identified requirements from a set of available patterns comprises:
   determining that a work process pattern is unavailable to satisfy the requirements; and
   constructing a work process using action patterns.

8. The computer-implemented method of claim 1 wherein identifying pattern types is performed by a user selecting from a set of available pattern types;
   selecting patterns is performed by a user selecting from the set of available patterns of the identified pattern type; and
   configuring the selected patterns is performed by a user incorporating the requirements into the selected patterns.

9. The computer-implemented method of claim 1 further comprising identifying and configuring content patterns that correspond to the requirements.

10. A computer-implemented method of developing a software application, the method comprising:
    providing a library of patterns including at least two different types of patterns, wherein the pattern types are selected from one or more of process patterns, object patterns, user interface (UI) patterns, and content patterns;
    identifying requirements for a desired software application;
    receiving a user selection of patterns from the library of patterns; and
    configuring the selected patterns in accordance with the identified requirements to generating the desired software application.

11. The computer-implemented method of claim 10 wherein the library of patterns includes process patterns corresponding to a plurality of discrete levels of a process pattern hierarchy.

12. The computer-implemented method of claim 11 further comprising constructing a procedure from lower level process patterns when a higher level process pattern that satisfies the identified requirements is unavailable.

13. The computer-implemented method of claim 10 further comprising using the selected patterns to identify additional requirements for the desired software application.

14. The computer-implemented method of claim 10 further comprising:
    identifying work roles to be supported by the desired software application;
    identifying a work style and a role content associated with each work role; and
    selecting and configuring content patterns and UI patterns that correspond to the identified work style and role content.

15. The computer-implemented method of claim 14 wherein the library of patterns includes UI patterns corresponding to a plurality of discrete levels of a process pattern hierarchy.

16. The computer-implemented method of claim 10 further comprising:
    identifying a process to be performed in the software application;
    selecting at least one process pattern corresponding to the identified process;
    identifying collaboration needs for the identified process; and
    selecting collaboration patterns corresponding to the identified collaboration needs.

17. The computer-implemented method of claim 16 further comprising:
    identifying work roles associated with the identified process; and
    selecting content patterns and user interface patterns that correspond to the identified work roles.

18. A computer-implemented method of developing a software application, the method comprising:
    receiving a set of available patterns at different discrete levels of a process hierarchy, wherein the patterns include business process patterns, work process patterns, and business action patterns;
    receiving requirements identified for a business process;
    mapping the identified requirements to patterns from the available patterns by mapping process-related requirements to a corresponding business process pattern, wherein process-related requirements for which a business pattern is unavailable are mapped to a corresponding work process pattern, and process-related requirements for which a work process pattern is unavailable are mapped to a corresponding business action pattern generating the software application, using the requirement mapped patterns.

19. The computer-implemented method of claim 18 further comprising:
    identifying collaboration needs and job roles that correspond to a work process pattern to which the identified requirements are mapped; and
    mapping requirements to patterns relating to collaboration functions and job role functions.

20. The computer-implemented method of claim 18 wherein the business process patterns represent a software application scenario, the work process patterns represent guided procedure templates, and the business action patterns represent guided procedure steps.

21. The computer-implemented method of claim 18 further comprising:
    identifying a job role associated with a process pattern;
    segmenting the job role into work roles; and
    mapping the work roles to content patterns and UI patterns.

22. The computer-implemented method of claim 21 wherein the content patterns and UI patterns are selected according to a work style associated with the work role and a role content for the work role.

23. The computer-implemented method of claim 22 further comprising:
    identifying work scenarios associated with the work role; and
    mapping the work scenarios to execution framework and activity UI patterns.

24. The computer-implemented method of claim 18 wherein the set of available patterns are provided in a pattern library;
    identifying requirements is performed by one or more users; and mapping the identified requirements to patterns is performed by one or more users incorporating the identified requirements into the patterns based on structures associated with the patterns.

25. An article comprising a machine-readable medium storing a data structure including definitions of a plurality of patterns for use in constructing a software application, the definitions of the plurality of patterns in the data structure comprising:

business action patterns that define guided procedure steps;

work process patterns that define guided procedure templates, wherein each work process pattern comprises a plurality of business action patterns;

business process patterns that define a generic software application scenario, wherein each business process pattern comprises a plurality of work process patterns; and wherein the patterns are accessible for use in constructing an application by configuring the patterns according to identified requirements for the software application wherein the patterns, configured according to identified requirements, are used in generating the software application.

26. The article of claim 25 wherein the plurality of patterns further comprise business object patterns, user interface (UI) patterns, and content patterns that are accessible for use in constructing the software application by configuring selected business object patterns, UI patterns, and content patterns according to identified requirements for the software application.

27. The article of claim 25 wherein the plurality of patterns further comprise collaborative content patterns for defining generic collaborative structures and the collaborative content patterns are accessible for use in constructing the software application by configuring the collaborative content patterns according to identified requirements for the software application.

28. The article of claim 25 wherein the plurality of patterns further comprise user-centric patterns comprising:

work style content patterns for defining generic work style contents that relate to factors that drive different users' work;

role content patterns for defining generic roles that can be assigned to different users; and wherein the work style content patterns and the role content patterns are accessible for use in constructing the application by configuring the patterns according to identified requirements for the software application.

29. The article of claim 25 wherein the plurality of patterns further comprise user-centric patterns comprising patterns relating to work scenarios for roles that can be assigned to different users, wherein the work scenario patterns are accessible for use in constructing the software application by configuring the patterns according to identified requirements for the software application.

30. A computer-implemented method of developing a software application, the computer-implemented method comprising:

identifying a job role within an enterprise;

segmenting the job role into work roles associated with the job role;

mapping each work role to at least one of a work style content pattern and a role content pattern;

identifying work scenarios associated with each work role; and mapping each work scenario to at least one work scenario user interface (UI) pattern wherein the patterns, configured according to identified requirements, are used in generating the software application.

31. The computer-implemented method of claim 30 further comprising configuring at least one personal resource page, based on the work style content pattern, in accordance with a personal support UI pattern.

32. The computer-implemented method of claim 30 wherein the at least one work scenario UI pattern comprises at least one execution framework pattern and at least one activity pattern.

33. The computer-implemented method of claim 30 further comprising:

identifying a work process associated with a work scenario; and mapping each work scenario to a work process pattern corresponding to the identified work process.

34. A computer-implemented method of developing a software application, the method comprising:

identifying a set of requirements for a business process software application;

mapping the identified requirements to a work process pattern that represents a guided procedure template for a work process;

identifying a plurality of job roles associated with the work process pattern;

segmenting each job role into work roles; and mapping the work role to a set of patterns comprising one or both of a content pattern and a user interface (UI) pattern generating the software application using the mapped patterns.

35. The computer-implemented method of claim 34 further comprising:

identifying collaboration needs associated with the work process based on the identified requirements;

selecting a collaborative content pattern corresponding to the identified collaboration needs; and mapping the collaboration needs to the selected collaborative content pattern.

36. A computer-implemented method of developing a software application, the method comprising:

segmenting a job role in an enterprise into work roles;

configuring a plurality of personal support user interface (UI) patterns in accordance with work styles associated with the identified work roles to produce personal support pages, wherein each personal support UI pattern corresponds to a work style;

identifying a plurality of work scenarios associated with the work roles;

mapping each work scenario to at least one UI pattern relating to an execution mode to produce an execution framework page, wherein each personal support page contains links to the execution framework pages generating one or more personal support pages and one or more execution framework pages.

37. The computer-implemented method of claim 36 further comprising:

identifying work activities associated with each work scenario; and mapping each work activity to a corresponding activity pattern to generate activity pages, wherein each execution framework page contains links to selected activity pages and the activity pages relate to specific activities within the execution framework.

* * * * *